United States Patent [19]
Dougherty et al.

[11] Patent Number: 4,816,736
[45] Date of Patent: Mar. 28, 1989

[54] POLYPHASE ALTERNATOR AND DUAL VOLTAGE BATTERY CHARGING SYSTEM FOR MULTIPLE VOLTAGE LOADS

[75] Inventors: Thomas J. Dougherty, Waukesha; Richard T. Johnson, Hubertus, both of Wis.

[73] Assignee: Globe-Union Inc., Milwaukee, Wis.

[21] Appl. No.: 25,217

[22] Filed: Mar. 12, 1987

[51] Int. Cl.$^4$ ............................ H02P 9/30; H02J 7/14
[52] U.S. Cl. ............................................. 320/17; 320/6; 322/90; 322/94
[58] Field of Search .................. 320/15, 17, 6; 322/90, 322/94

[56] References Cited

U.S. PATENT DOCUMENTS

| | | | |
|---|---|---|---|
| 3,793,544 | 2/1974 | Baumgartner | 322/90 X |
| 4,047,088 | 9/1977 | Himmler | 320/17 X |
| 4,153,869 | 5/1979 | Ragaly | 322/90 |
| 4,179,647 | 12/1979 | Cummins et al. | 320/17 X |
| 4,479,083 | 10/1984 | Sullivan | 320/6 |
| 4,491,779 | 1/1985 | Campbell et al. | 320/17 X |
| 4,686,442 | 8/1987 | Radomski | 322/94 X |

Primary Examiner—R. J. Hickey
Attorney, Agent, or Firm—Andrus, Sceales, Starke & Sawall

[57] ABSTRACT

A 24/12 volt battery power supply for a vehicle includes two 12 volt batteries connected in series, and having first and second 24 volt terminals to the opposite ends of the batteries and a 12 volt terminal to the center common connection of the batteries. The 12 volt loads are divided into equal right and left side vehicle loads and the right side is connected across one battery and the left side is connected across the second battery. A three phase wye-connected alternator has the winding connected to a full wave three phase rectifier, the D.C. output of which is connected to the 24 volt terminals. The center common connection of the winding is connected directly to the 12 volt terminal. The system operates with balanced currents and charges on the two 12 volt batteries so long as the 12 volt loads remain balanced. Control loads are selectively connected to the right and left side loads if a 12 volt load is lost, disconnected or otherwise changes to maintain the balanced system but only if the imbalance due to lost loads is large. In another embodiment, the full wave rectifiers are connected to conduct the opposite half cycles of the alternator output. The controlled rectifiers for each half cycle have the gates connected to a common gate source, and a logic circuit monitors the voltage of each battery and actuates one or the other of the rectifier groups to prevent one battery segment from significantly varying in voltage with respect to the other.

21 Claims, 2 Drawing Sheets

POLYPHASE ALTERNATOR AND DUAL VOLTAGE BATTERY CHARGING SYSTEM FOR MULTIPLE VOLTAGE LOADS

BACKGROUND OF THE PRESENT INVENTION

The present invention is particularly directed to a polyphase alternator driven battery charging system for multiple voltage loads and particularly to such a system including a three-phase alternator connected to supply power at a first high direct current (D.C.) voltage to a load and at a second lower D.C. voltage to a different load.

In various engine driven applications such as over the road vehicles, off road vehicles, marine applications and the like, an internal combustion engine is the main power plant for driving of the corresponding vehicle. Various associated equipment for the internal combustion engine and the vehicle requires electrical power. The internal combustion engine will normally be provided with an electric starter. Electrically operated compressors, window heater defroster and other similar relatively heavy load devices may also be coupled to and used in the vehicle or other device. Uniformly, rechargable batteries are provided as the basic power supply. The battery provides power for starting of the vehicle as well as for operating the other loads in the absence of the vehicle operation. An alternator or generator is coupled to and driven by the engine for charging of the batteries to maintain stand-by power and to provide operating power to the loads during the operation of the vehicle and the loads. Certain of the electrical loads generally can be operated more efficiently at higher voltages. In heavy industrial vehicles, buses, large heavy trucks and the like, systems have been developed using 24 volt battery systems with a corresponding alternator for charging of the battery. Such systems are advantageously used for example for starting of the vehicle during cold weather conditions and the like. The 24 volt supply requires only half the current to produce the power output. Thus, the power loss in the circuit wiring and other connections, which is related to the square of the current, is significantly reduced. However, certain loads generally are operated more reliably and effectively from the conventional 12 volt supply. For example, vehicle lighting systems, sound systems and the like should be designed to operate at 12 volt. Although 24 volt lamps can be provided, the higher voltage lamps have fragile filaments and are often subject to breakage under rather normal operating conditions. As a result, practically all 24 volt systems used in vehicles provide a dual voltage supply to maintain 12 volts supplies for lighting and other accessories while providing a 24 volt supply for starting and operating of other selected loads. In present dual voltage systems; the battery unit includes the pair of 12 volt batteries with the 24 volt loads connected across the two batteries and the 12 volt loads connected across one of the two batteries. Switch means provide for selective connection of the loads to the battery unit. In operating the 24 volt loads, the two batteries are loaded and supply power to the load. The 12 volt loads draw power from only one of the batteries creating unbalanced loading and discharging of the two batteries in the system. The subsequent charging of the battery unit establishes a charging current through all the series cells thereof, or require use of separate rectifiers and switch connection to the alternator. The unbalanced loading and subsequent recharging is generally undesirable and various means have been suggested to provide controlled charging of the batteries using relatively complex and costly systems with the usual subsequent service and maintenance requirement. Even with the various available monitoring systems, there is a significant danger or possiblilty that one or more battery cells will fail as the result of excessive alternate loading and charging. The cost of the dual 24/12 volt system has also limited the application such that mass production of the 24 volt batteries is not competitive with the standard 12 volt for the standard automobiles, small trucks and the like. The 24/12 volt systems generally use complex electronic control systems to monitor and maintain appropriate charging of the batteries and connection of the loads to the respective circuits.

An alternator is presently widely used for the charging of the battery system in vehicles. The alternator is advantageously a three phase alternator in which the rate of rise of the current output decreases at increased speeds. However, in such alternators, a battery must be maintained connected to the alternator as a load to prevent the voltage from rising to a destructive level. Thus, as the load is reduced on the alternator, the voltage increases. The winding may be wound as a three phase wye winding.

The output of the alternator is rectified through a full wave rectifier to change the alternating current to direct current. A three-phase full-wave rectifier, of a well known construction, is shown consisting of paired uni-directional conducting devices, normally solid state diodes, connected in series. The diodes conduct in a single direction and by appropriate interconnection of the windings and the paired diodes, as shown, current flow is established from the three phase winding to a positive output line, through the battery unit and/or load units and a return line connected to the opposite side of the three-phase windings. Theoretically, the current flow in the winding should be so balanced and arranged that there is a zero potential and current available at the common center point of the Y-connected windings. Uniformly in practice, a voltage exists at the common point which has been used and connected into prior art electrical systems for operating of small auxiliary loads such as indicating lamps and the like. It has also been suggested that such common terminal can be connected into circuit through a separate pair of diodes to provide a D.C. output which can be connected into the battery and load circuit. The latter use may provide an improvement on the order of 15% in the efficiency of the system.

Typical prior art systems are shown in the following U.S. Pat. Nos. 3,962,621; 4,019,120; 4,156,171 and 4,153,869.

SUMMARY OF THE INVENTION

The present invention is directed to a multiple voltage battery system for a vehicle having an alternator unit and rectifier for charging of the battery system in a balanced state. Generally, in accordance with the present invention, the battery system includes a single series battery unit establishing a maximum voltage at high voltage terminal means for operating loads at a first high voltage. The battery unit has an intermediate central connection with which each of the high voltage terminal means defines first and second battery segments of voltage equal to one half of the maximum voltage for operating loads at one half the maximum battery system for present automobiles, trucks and the like, have 24 volt loads and 12 volt loads, and such a typical example is used herein for reference purposes only. In accordance with the present invention, the 12 volt loads are divided, preferably into equal load units, and connected one each across each battery segment. The alternator is constructed with the output winding connected to a full wave rectifier which is connected across the 24 volt terminal means of the battery unit to charge the battery to the full voltage. In addition, a central connection of the output winding is made to the central battery terminal means to establish individual half wave charging circuits for each of the battery segments, which can produce individual charging of the two segments.

With the present invention, the alternator provides a maximum charging voltage slightly above the desired nominal charge, such as 24 volts. Each battery segment is therefore charged to a voltage slightly above the nominal 12 volts. The output of the alternator is thus a fixed voltage which is capable of providing all of the current necessary for charging of the battery segments as well as driving of the loads. If the load is unbalanced, with respect to the two battery segments, the heavier loaded unit will tend to discharge the corresponding battery segment. The voltage across the two battery segments in series are fixed at the alternator output voltage. Thus, if the one battery voltage drops, the voltage of the opposite battery will tend to correspondingly increase such that the higher voltage maintains the voltage of the alternator in the battery system. However with the present invention, both of the battery segments are in essence subjected to one half of the output voltage of the alternator, with individual circuit connection as the result of the center tap connection. As a result, the lesser loaded battery opposes increasing its voltage while the more heavily loaded battery segment with the lower charge will readily accept additional charging current. As the result, particularly with the essentially equalized loading, and the separate individual charging loops, the battery circuit will rapidly self-balance with the discharged battery brought back to the equal level.

The system which relies on current balancing with the battery and load circuits is particularly adapted to the use and implementation with the present lead acid batteries having the lower percentage of antimony or no antimony, preferably those containing 2% or less antimony in the grids. The voltage versus current characteristic then provides a rapid change in the battery cell voltage with current increase to provide rapid rebalancing of the batteries.

In accordance with one aspect of the invention, the symmetry of the winding, battery segments and loads is of course of substantial significance. To avoid significant changes in the loading, means may be provided for balancing of the two 12 volt load units to maintain essentially equal loading and therefore equal discharge of each segment, which will thereby provide an equalized current flow for charging of each segment. Alternatively, or even in addition, the common connection of the battery segments may be switched to the alternator rectified output segment to maintain the desired and necessary balanced charging of the battery segments.

The automated balancing of the system and particularly the provision of balanced loads and appropriate charging current between the battery segments is of primary significance in maintaining and establishing long battery life. Both the degree of discharge and the recharge characteristic can adversely affect battery life. It is well known that the life of a lead-acid battery will decrease significantly if the battery is allowed to discharge to a low level. Thus, as the energy consumed increases as a precentage of total available energy at any given time, damage to the battery active material increases, when compared with recharging and replacing of the energy prior to significant discharge. Significant load imbalance on the two battery sections could promote a greater depth of discharge in the battery segment having the highest current load resulting in earlier failure of that portion of the battery system or unit. Further, the recharge rate to a battery segment can, if excessive, adversely effect the battery life. The recharge energy should therefore be limited to the amount of discharge plus a small excess to allow for efficiency for losses. Electrical energy input over and above this latter level can result in accelerated deterioration of the battery components of the segment so charged. Without an appropriate balancing of the currents in the two segments, the alternator voltage regulation would tend to promote overcharging of the battery segment having the lowest current load and undercharging of the segment having the highest current load. The resulting overcharging of one unit and the undercharging of the other unit would adversely affect both of the battery segments and contribute to a reduced service life of both segments.

The present invention provides a new dual voltage supply for a vehicle which may use a conventional alternator and conventional regulator as presently mass produced for a vehicle dual voltage supply, without the necessity of complex and costly controls to properly charge the battery system and operate the loads. The dual voltage supply of the present invention may be readily applied to existing vehicle system, as well as to new production, by appropriate wiring of the load system to the supply.

BRIEF DESCRIPTION OF THE DRAWINGS

The drawings furnished herewith illustrate a preferred construction of the present invention.

In the drawings.

DESCRIPTION OF ILLUSTRATED EMBODIMENT

Figure 1:
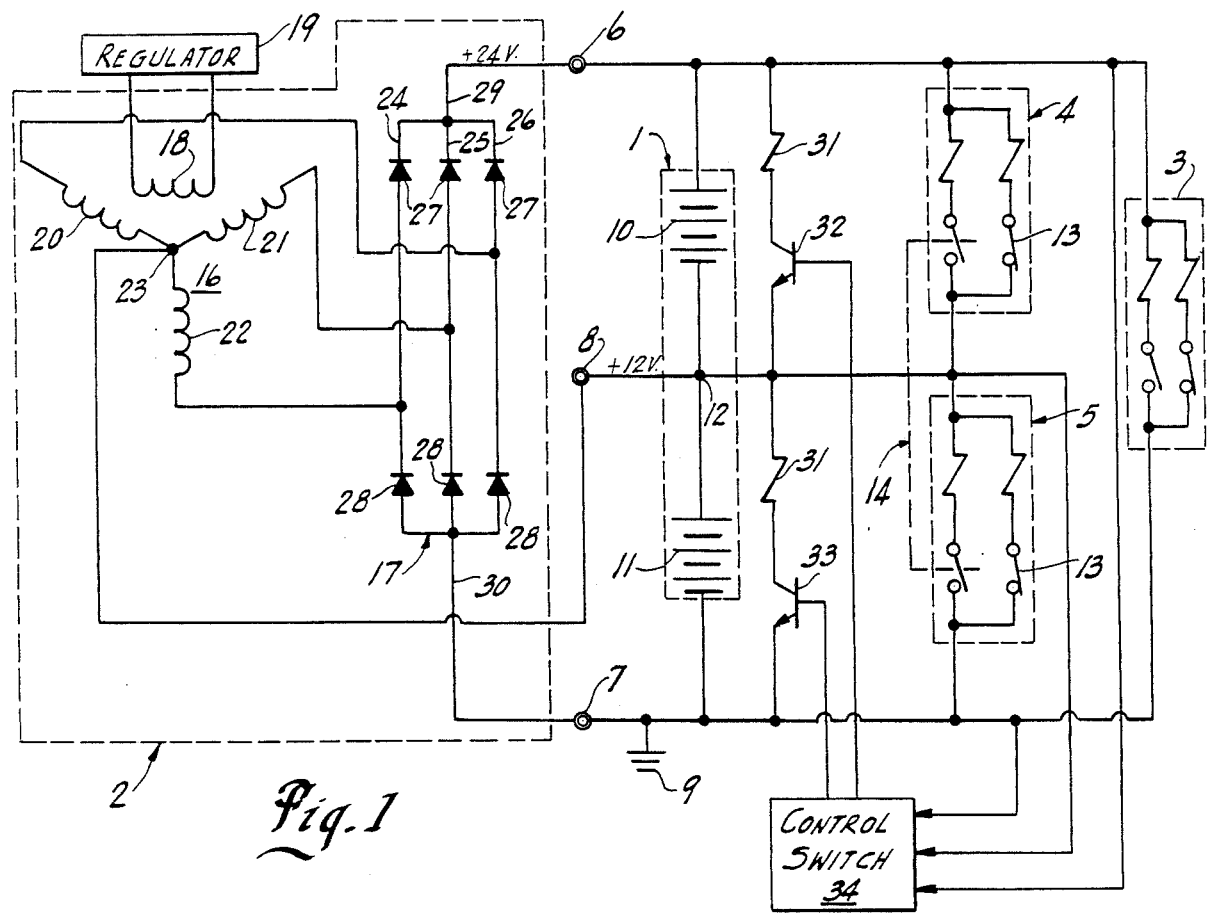
FIG. 1 is a schematic circuit diagram of a alternator driven battery charging and load system for an internal combustion engine and providing dual voltages for operating of different rated voltage loads.

In the drawing, a vehicle electrical system is schematically illustrated and includes a battery unit 1 for standby load operation and an alternator unit 2 for maintaining of the battery unit fully charged and for directly providing power to a plurality of load units 3, 4 and 5 during operation of the vehicle and the internal combustion engine, not shown. In the illustrated embodiment of the invention, a battery unit 1 provides a 24 volt output between 24 volt terminals 6 and 7 defining a first and second high voltage terminal for operating of load unit 3, a first 12 volt output across a s of terminals including terminal 6 and a third intermediate terminal 8 and a second 12 volt output across a third intermediate set of output including terminal 7 and terminal 8 connected in the illustrated embodiment as a center terminal. The one 24 volt terminal 7 is connected as a common ground line as shown at 9. The battery unit 1 may consist of a single multiple cell rechargable battery or two 12 volt batteries 10 and 11 connected in series, as shown. In either system, the internal series connection defines a center tap 12 within the 24 volt system. The center tap 12 is connected as the common terminal to the two 12 volt power supply sections or batteries 10 and 11. Load unit 3 is connected across the 24 volt terminals 6 and 7 for direct energization. Load units 4 and 5 are 12 volt loads and are divided into essentially equal total load units. Load unit 4 is connected to the first 12 volt terminal 6 and 8 connected in the illustrated embodiment as a center terminal and load unit 5 is connected to the second 12 volt-terminals 8 and 7. The several load units 3, 4 and 5 may each include one or more individual loads, connected in parallel to the appropriate voltage; as shown. The individual loads within each load unit 3–5 may include a separate switch unit 13, or certain loads such as for the headlights may have a simple common switch unit 14.

The 24 volt load unit 3 will include the starter, window defrosters and such other equipment appropriately operated at 24 volts. The lights, sound system, accessories and the like which operate at 12 volts are divided to form load units 4 and 5 and connected to the two sets of 12 volt terminals 6–8 and 8–7.

The battery unit 1 in accordance with conventional practice is only operative to supply current and voltage during standby operation, such as when the engine is not operating and the alternator unit 2 therefore does not provide any power, or at low idle speed when the output of the alternator may be insufficient to provide the necessary power for operating of the total load system. The alternator unit 2 generates an output voltage of 24 volts and is coupled to and driven by the engine. The alternator unit 2 has its output connected to charge the 24 volt battery unit to maintain the charge on the battery. The rectified output of the alternator unit 2 also directly drives the 24 volt load unit 3 and both of the 12 volt load units 4 and 5 during normal vehicle operation. The alternator unit 2 includes an A.C. alternator 16 and a full wave bridge rectifier unit 17 connected to supply D.C. power for charging of the battery unit 1 and operating of the loads 3, 4 and 5. The alternator 16 produces the necessary full load current for the several load units 3–5 of the vehicle.

The alternator 16 is preferably a known three-phase alternator with a self-limiting current construction. The output of the alternator increases with the speed. However, as the speed increases, the electrical reactance characteristic of the alternator windings is such that the current level is limited to a maximum output. The voltage output is also dependent on the speed and the energization level of an exciter field winding 18. A voltage regulator 19 is connected across the output of the alternator winding 16 and energizes winding 18 to limit and maintain an appropriate nominal 24 volt supply to the battery unit 1 and to the loads 3–5. As more fully developed hereinafter, the circuit connections in the 24 volt and 12 volt supply system must be specially controlled and monitored to maintain appropriate current flow through the system to prevent unbalance and rapid destruction of the battery system.

The illustrated three phase alternator 16 is a Y-connected alternator having three separate phase windings 20, 21 and 22, which are wound within a suitable magnetic core, not shown, in physically circumferentially spaced relation such that the peak current and voltage generated in each of the windings is separated from that in the other winding by 120 electrical degrees. The output of each windings 20–22 is an alternating current sine wave in accordance with conventional and well-known alternator operation. The three windings 20–22 are electrically connected in a known wye-connection in which one corresponding end of such winding is connected to a common termination or connection as at 23 while the opposite end is individually connected via rectifier unit 17 to the vehicle electrical system including the battery unit 1 and the load units 3, 4 and 5 to supply direct current to the battery units and the load units. The voltage generated by each winding is controlled by the energizing of the separate field winding 18. The field winding 18 is connected to the output of the three phase winding or battery for energization under the control of the voltage regulator unit 19. Any suitable voltage regulator such as those presently used in the control of alternator systems can be employed to provide an appropriate 24 volt output from the alternator for charging of the battery unit and energizing of the load units.

The rectifier unit 17 includes three similar branches 24, 25, and 26, each of which similarly includes a pair of series diodes 27 and 28. The several branches 24–26 are connected in parallel between D.C. output leads 29 and 30, which are connected to the output terminals 6 and 7 of the battery unit 1. The phase windings 20–22 are respectively connected to the common center connection of the diodes 27–28 in the three branches 24–26 to complete the known connection of the rectifier unit 17. The output of the rectifier is a D.C. voltage and current with the output lead 29 at a positive voltage relative to the output lead 30. The positive lead 29 is also connected to the positive battery terminal 6 to establish proper power supply connection for charging of the battery unit 1 and for energizing of the loads 3–5 directly from the alternator unit 1.

In accordance with the present invention, this common center wye-connection 23 is connected to the common twelve volt terminal 8, positive on one battery negative on the second battery, to the load units 3–5 and to the battery unit 1. The connection of the center connection 23 and the center of the load and 24 volt battery system establishes current paths from the alternator 16 through the twelve volt sections as well as the standard connection of the rectifier through the series connected battery sections 10 and 11. The separate circuit to the individual batteries 10 and 11 is through the opposite sides of unit 17 and provides half wave rectification. Thus, each phase winding 20–22 is connected in series with one of the diodes 27 or 28 and one of the batteries 10 or 11, and thus during the appropriate half cycle establishes current flow to the corresponding battery and load. For example, the outer end of the winding 21 is connected to branch 25, and assuming a positive half cycle, will conduct through diode 27 to line 29, terminal 6 and the battery 10, to common connection, terminal 8 to the common wye-connection 23, and thus to the return side of winding 21.

The system will thus maintain equal loading and functioning of the two batteries 10 and 11 so long as the loading of thereof is maintained nearly equal. The 24 volt load unit 3 drains current and power from across both batteries 9 and 10 and establishes the same loading. The 12 volt load unit 4 and 5 will similarly load the connected batteries 10 and 11, respectively, as long as the load units are of the same level, with a corresponding current demand and discharge and charging of each battery 10 and 11.

The inventors have found that with substantial equalization of current flow in the two load units that the two 12 volt batteries operate with essentially equal charge. The inventors have further discovered that the system with the center tap charging circuit connected to the common of the three-phase wye winding automatically maintains the balanced charge on the two 12 volt batteries.

Referring particularly to the phase winding 1, any two phase voltages add to provide maximum equal to approximately one half of the maximum alternator voltage. The phase windings are applied equally to each battery 10 and 11 and tend to charge the batteries slightly above the fixed voltage for maximum efficiency. For example, in a 24 volt system, the alternator output may be fixed at 27.6 volts, each of the batteries may be charged, at maximum charge, to approximately 13.8 volts. With the loads 4 and 5 applied to the batteries 10 and 11 and the alternator 16 fixed to maintain the 13.8 volts to each of the batteries 10 and 11, any change or unbalance in the loads will tend to redistribute the current flow in the system for balancing the charge on the batteries, and in fact rapidly charge the discharged battery while limiting overcharge of the opposite battery. Thus for example, if the load unit 4 should rapidly increase relative to load unit 5, the greater load would tend to pull the voltage of the corresponding battery 10 down. For example, if that voltage should drop to 12.8 volts, the opposite battery would have to increase to 14.8 volts to maintain the total 27.6 volts; the output voltage of the alternator.

However, because of the center tap arrangement of this invention, the second battery segment 11 has a tendency not to rise above the 13.8 volts by the alternator segment applied thereto. The result would be an interaction between the several circuits causing a rapid increase in current for recharging of the battery segment 10 to maintain the balance condition. Although the decreasing load would then tend to decrease the current in the segment of battery 10 and increase the current in the segment of battery 11, the circuit itself would oppose such current redistribution and result in the effective increasing charging current to the lower voltage battery 10 to provide a rapid charging thereof and rebalancing of the circuit. Further, it will occur in a rapid manner thereby preventing excessive discharge of either battery.

The rebalancing can of course only occur within a certain limited battery differential. If the loads should change dramatically and by a very significant level, the system, although tending to rebalance, may find it impossible to effect the desired rapid rebalancing so as to prevent excessive discharge or overcharge of the respective battery segments. To this end, the auxiliary loads are provided with the automatic means for inserting of the small resistor loads into a circuit to maintain balanced load units as described presently.

In addition, in accordance with a preferred construction of the present invention, auxiliary load units 31 are similarly and respectively connected through separate switch units 32 and 33, shown as transistor units, in parallel with each of the 12 volt sections or batteries 11 and 12 of the battery unit 1. The switch units 32–33 are coupled to a voltage sensing unit 34 for selective and individual actuation of the switch units for selective connection of the load units 31 into the circuit with loads 4 or 5. The sensing unit 34 monitors the respective voltage levels of the two 12 volt batteries 10 and 11. The unit 34 may be simple Zener diodes connected one each to monitor each battery voltage and connected to send current through the appropriate transistor and load resistor 31. In a dual 12 volt system, each Zener diode may be selected to be a responsive within a range of 14–16 volts, and typically 15.1 volts. If the voltage changes by a corresponding predetermined level, the proper switch unit is turned on to provide for automatic insertion of the additional load to again equalize the loads and balance the two twelve volt sections. More particularly, if the loads 4 and 5 are not balanced, the current level in the lower level load will increase, and the voltage of the corresponding battery will decrease. For example, the lighting system would be divided with right side lighting connected as load unit 4 and the left side lighting connected as load unit 5. If the right side headlight should go out, the alternator would decrease the current flow to the load unit 4 and the battery 10. Thus, the alternator 16 is capable of providing balanced current demand and will respond in accordance with the loading, which in effect is the current limiting factor in such alternator systems. The voltage across each load unit is reflected in the current flow through the loads, such that with an unbalanced loading of the batteries 10 and 11, the voltages will be unbalanced. The unbalanced voltages are reflected in an unbalanced total output current and operation of the two batteries. By turning the appropriate transistor 32 and 33 on and off, the loads and charging are maintained in a balanced mode. The charging and load currents in the respective individual 12 volt loops will therefore automatically balance to re-establish and maintain appropriate essentially equal charging of the 12 volt sections to establish and maintain essentially corresponding voltages. The 24 volt output will of course be maintained equal to the sum of the two 12 volt sections.

Figure 2:
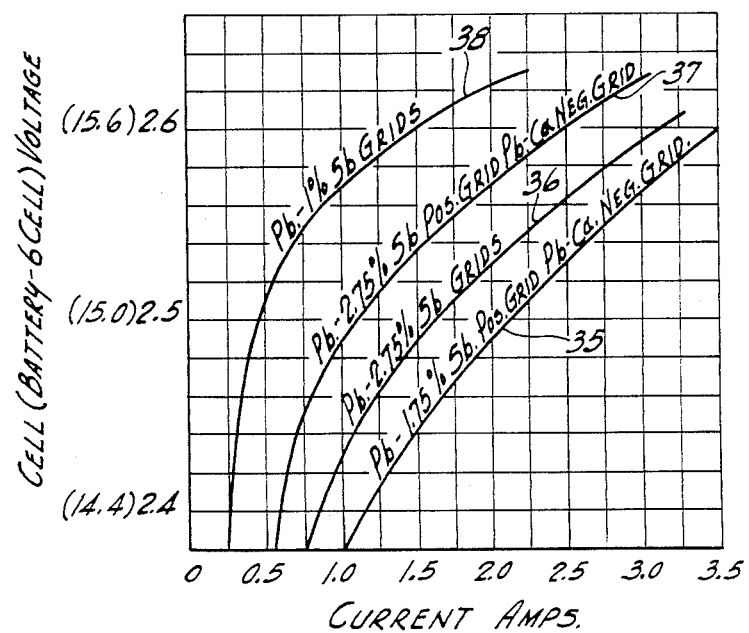
FIG. 2 is a diagrammatic illustration of the voltage and current characteristic of different batteries.

With the present invention, lead-acid batteries having a low percent antimony lead grid composition are preferably used because the voltage rises rapidly with increased current, such as shown in FIG. 2. The more conventional lead-acid battery, as shown by characteristic 35, has a very small change in voltage with current, whereas the more recent low antimony percentage batteries, as shown by characteristics 36, 37, and 38, have a significant change in the voltage. Thus, the battery units with battery cells of such a voltage vs. current characteristic will rapidly respond and balance the charge and voltage of the two battery units in response to the current in the several loops. Thus the batteries 10 and 11 are preferably units containing 2% or less antimony or no antimony in the battery grids.

Further, the auxiliary load 30 and 31 may be connected in circuit with series diodes, not shown, to rectify the current flow through the added loads. However, the diodes would introduce an undesirable extra voltage drop into the load circuits.

The system shown in FIGS. 1 and 2 is particularly satisfactory, but further variations may be used. For example, the transistor switch system of FIG. 1 may be replaced with a simple relay system such as shown in FIG. 3.

Figure 3:
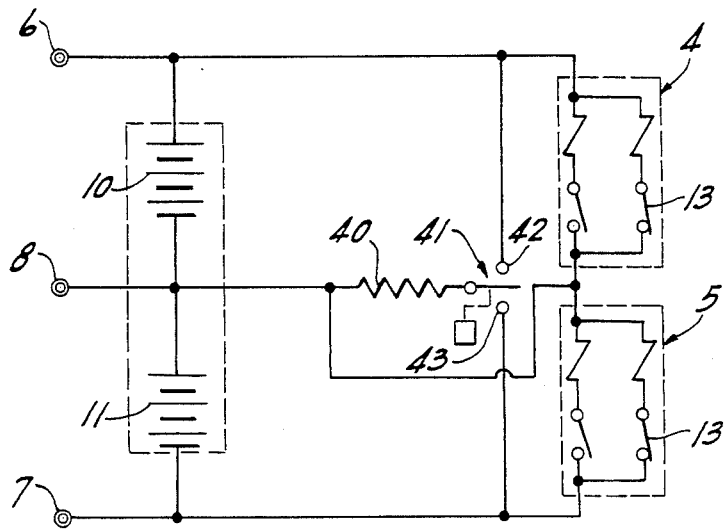
FIG. 3 illustrates a modification to the circuit of FIG. 1.

Referring to FIG. 3, a single resistor load 40 is connected to common battery connection 12. A three position relay 41 has a common contact connected to load 40 and selectively movable from an open position into engagement with a first load contact 42 or a second load contact 43. Contact 42 is connected to the positive side of battery 10 and contact 43 is connected to the negative side of battery 11. The relay is connected to the voltage monitor 34 and actuated in accordance with the voltage differences to connect resistor load 40 parallel with the proper battery 10 or 11, and the corresponding load units 4 or 5, to maintain the balanced loading and current flows within the system.

Figure 4:
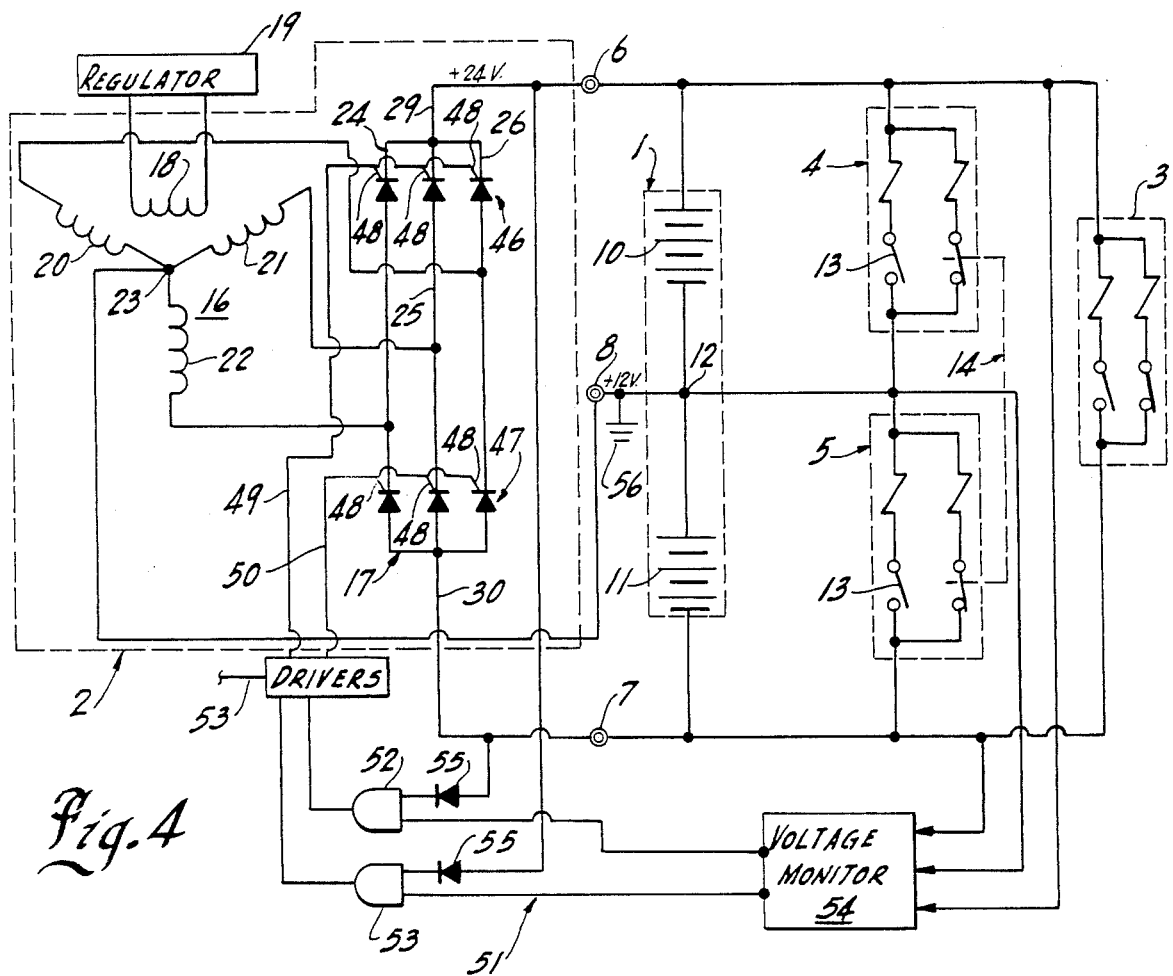
FIG. 4 illustrates a further embodiment for controlling the charging of battery segments of battery supply.

In addition to the illustrated variations, the center tap connecting could be automatically switched to conduct and maintain the desired balanced state of the battery segments 10 and 11 in response to any variation in the battery voltages. A logic circuit could be provided to control suitable switching units to control the individual charging of the battery segments. For example, referring to FIG. 4, the auxiliary loads have been removed and the full wave rectifier 17 is constructed with the diodes replaced by unidirectional conductors, shown as controlled rectifiers. The rectifiers are grouped into a first group of controlled rectifiers 46 operable to conduct the corresponding positive half cycle output of each winding 20-22 to charge battery unit 10 and a second group 47 operable to conduct the negative half cycle of output of the windings to charge the battery unit 11, with the conduction of each group being completed through the common center tap lead and one of the battery units 10 and 11. Each rectifier 46 and 47 includes a gate 48. A signal applied to the gate 48 with the proper polarity across the rectifier causes the rectifier to conduct for the corresponding half cycle of the alternator output and supply current to the battery assembly. The gates of each group 46 and 47 are tied to each other by common gate leads 49 and 50 respectively, to fire all rectifiers of the group together. A battery voltage logic circuit 51 is connected to selectively supply a turn-on signal to the rectifiers. The circuit 51 includes a pair of logic AND gates 52 and 53 coupled to the output of the voltage monitor unit 54. The group of controlled rectifiers 46 or 47 are turned on only if the logic control circuit 46 detects a voltage differential of a predetermined magnitude across the loads and therefore the battery segments 10 and 11. In the illustrated embodiment of the invention, AND gates 52 and 53 separately control the firing of the two groups of rectifiers 46 and 47 to provide conduction only during the appropriate half cycle for charging of the alternate battery segments. Thus, the one battery segment 10 will be charged during one half of the cycle of the alternator output while the other battery segment 11 can be charged during the opposite half of the cycle, as the result of a half wave rectification connection of the opposite halves of the full wave rectifier to the battery segments 10 and 11. Each of the AND gates 52 and 53 has a first input connected to the output of the voltage monitor unit 54 to detect the voltage differential and to select which of the AND circuits is to fire. In addition, a control diode 55 is coupled to the output of the alternator rectifier 17 to fire only during the appropriate half cycle for providing proper charging current to the corresponding battery segment 10 or 11. The diode 55 is connected to the output of the rectifier 17 and is appropriately biased to turn on the AND gate 52 or 53, when the half cycle of rectified power is positive relative to the battery to be charged. The output of AND gates 52 and 53 actuate a gate current driver 55 connected respectively to gate leads 49 and 50. Thus, if the load on the battery units 10 or 11 change, or the voltage of the batteries tend to change for any other reason, the voltage monitor 54 and logic circuit 51 respond to a selected change to create a gate current at either lead 49 or 50 to provide current from alternator 16 to the corresponding battery. Of course, if the 24 volt load, or any other cause, drops the voltage of both units 10 and 11, gate current is provided at both leads 49 and 50 to provide charging of both units 10 and 11. This provides a solid state switching system for selectively connecting the discharged battery unit 10 or 11 directly into the alternator circuit for maintaining of the battery units 10 and 11 at its proper charge. Gates to either set of these SCR trio could also be partially switched on for a second type of current control.

Although shown specifically applied to a wye-connected alternator, the present invention may be applied to a alternator by providing appropriate connecting of the winding to provide an appropriate connection into the battery system for selective charging of the dual loaded battery segments to maintain balanced charge. Similarly, the particular method of balancing current loads and thereby the current flow through the individual battery sections may of course use different forms of loading and the like. Further, as the present invention is basically the concept of maintaining equalized loading and current flow through the battery sections, various controlled switching means may readily be applied. For example, the rectifying diodes may be replaced with controllable switch units such as SRC's to control the current to the respective battery sections and loads.

In summary, the system has been found to provide automatic balancing of the currents and voltages within the loops to maintain the batteries essentially at the desired maximum or full charge as long as the load units do not vary significantly. The precise interaction depends on the particular loads and voltages at any given instance, but would appear to result from the fact that the total voltage output of the alternator is fixed and determines the actual voltage across the two battery segments in series, and also fixes the voltage to which each battery segment will charge. If the voltage of one battery segment decreases, the voltage across the other battery segment will tend to increase as a result of increasing charging current to compensate and maintain the total output voltage equal to the desired output of the alternator. With the center tap balance connection however, any change in the voltage tending to increase above the maximum charge voltage will be opposed by that battery segment and tend to oppose any increasing current even though it would normally tend to provide increased current to the loads. Simultaneously, the discharged battery segment will be in the condition to accept current to bring it back to the desired voltage and the output of the alternator will thus function to rapidly bring the lower voltage battery segment to the balanced state, thereby removing the tendency of excessive driving of the other battery. The batteries in effect function as large capacitor devices so that they can readily accept current, condition permitting rapid charging.

In this aspect of the invention of course, the characteristics of the batteries have been found to be of significance and the battery is preferably a battery unit containing 2% or less antimony or no antimony within the grid.

The present invention thus provides a very reliable and simple modification for dual voltage systems for operating of relatively high voltage loads in the vehicle and of the desirable low voltage loads in the vehicle at the proper voltages while establishing and maintaining electrical loading and charging characteristics necessary for long operative battery life. The present invention is equally applicable to a single battery unit for providing a maximum output voltage, with a center tap for providing the two separate voltage sections, as well as individual batteries connected in series to provide the same dual voltage supply.

Various modes of carrying out the invention are contemplated as being within the scope of the following claims particularly pointing out and distinctly claiming the subject matter which is regarded as the invention

We claim:

1. A dual voltage battery power supply system for vehicular devices having multiple load means of different voltages, comprising
    a battery means having first and second voltage terminal means defining a high voltage supply and having an intermediate terminal means defining first and second low voltage supplies with respect to said first and second voltage terminal means,
    a polyphase alternator having a polyphase winding including a plurality of phase windings connected to polyphase output terminal means for supplying a polyphase output voltage and having a center terminal means connected to each of said phase windings to divide the voltage of each phase winding,
    a single full wave rectifying circuit connecting said battery means to said polyphase output terminal means and to said first and second voltage terminal means to supply full wave rectified power to said first and second voltage terminal means and to said battery means,
    and means connecting said intermediate terminal means of said battery means to said center terminal means of said polyphase winding for connecting the battery means to the opposite sides of said intermediate terminal means into separate charging circuits with the polyphase winding and said full wave rectifying circuit whereby the voltage of each phase winding is divided and connected in circuit through said rectifying circuit.

2. The power supply system of claim 1 includes first and second load units of the same voltage rating, said first and second load units having essentially equal load levels, said first load unit connected between said intermediate terminal means of said battery means and said first voltage terminal means, and second load unit connected between said intermediate terminal means of said battery means and said second voltage terminal means.

3. The power supply system of claim 2 including an auxiliary load means, switch means connecting said auxiliary load means in circuit with said first and second load units, and control means to monitor the voltage level of said first and second low voltage supplies and operable to actuate said switch means to connect said auxiliary load means in circuit with one of said first and second load units in response to a selected voltage difference for re-establishing equal voltages in said first and second low voltage supplies.

4. The power supply system of claim 3 wherein said auxiliary load means includes a resistor means connected to said intermediate terminal means, and said switch means connects the resistor means to said first or second voltage terminal means.

5. The power supply system of claim 3 wherein said auxiliary load means includes separate first and second loads, each auxiliary load includes a resistor means, said switch means including a first solid state switch unit connecting said first load in parallel with said first low voltage supply, and said switch means including a second solid state switch unit connecting said second load in parallel with said second low voltage supply.

6. A dual voltage battery power supply system for vehicular devices having multiple load means of different voltages, comprising
    a battery means having first and second voltage terminal means defining a high voltage supply and having an intermediate terminal means defining first and second low voltage supplies with respect to said first and second voltage terminal means,
    a polyphase alternator having a polyphase winding including a plurality of phase windings connected to polyphase output terminal means for supplying a polyphase output voltage, said polyphase winding wound as a wye-connected winding having a common center connection connected to said intermediate terminal means,
    a single full wave rectifying circuit connecting said battery means to said polyphase output terminal means and to said first and second voltage terminal means to supply full wave rectified power to said first and second voltage terminal means and to said battery,
    and means connecting said intermediate terminal means of said battery to said center connection of said polyphase winding for connecting the battery means to the opposite sides of said intermediate terminal means into separate charging circuits with said polyphase winding and said full wave rectifying circuit whereby the voltage of each phase winding is divided and connected in circuit through said rectifying circuit.

7. The power supply system of claim 6 wherein one of said first and second voltage terminal means connected as a common ground whereby said first low voltage supply is floating voltage and second low voltage supply is a grounded voltage.

8. The battery power supply system of claim 1 wherein said battery means has a low antimony-lead or non-antimony lead battery grid means and has a rapid change in voltage with change in current.

9. The battery power supply system of claim 6 wherein said full wave rectifying circuit includes solid state gated unidirectional conductors, and means to monitor the voltage of said first and second low voltage supplies and connected to said gated unidirectional conductors to establish said separate charging circuits for maintaining a minimum charge on each of said first and second low voltage supplies.

10. A battery power supply system for a mobile vehicle for supplying a first load at a selected voltage and a second load at one half said selected voltage, comprising a battery means having a series of cells connected to each other between first and second voltage terminal means to establish said selected voltage and having a central connection between two cells of said series of cells, a center terminal means connected to the central connection of said series of cells to define said half voltage at said center terminal means, a polyphase alternator having a polyphase winding including a plurality of phase winding connected as a wye-connected winding to polyphase output terminal means for supplying a polyphase output voltage and having center terminal means connected to said wye-connected phase winding to divide the voltage of each phase winding and having the wye-connected phase winding connected to establish individual battery charging circuits across said first and second voltage terminal means and across each of the center terminal means and the first and second voltage terminal means, a single full wave rectifying circuit connecting said battery means to said polyphase output terminal means and to said first and second voltage terminal means to supply full wave rectified power to said first and second voltage terminal means and to said battery means, and means connecting said intermediate terminal means of said battery to said center terminal means of said polyphase winding for connecting the battery means to the opposite sides of said intermediate terminal means onto separate charging circuits with said polyphase winding and said full wave rectifying circuit whereby the voltage of each phase winding is divided and connected in circuit through said rectifying circuit, said second load being formed into first and second load units of similar load resistance, said first load unit connected between the center terminal means and the first voltage terminal means, said second load unit connected between the center terminal means and said second voltage terminal means, and third load means, connecting means connecting said third load means to said first and second load units to balance the first and second load units.

11. The battery power supply system of claim 10 wherein said battery means has a rapid change in voltage with current 12. The battery power supply system of claim 10 wherein one of said first and second voltage terminal means is connected as a system ground.

13. A multiple direct current supply system for a vehicle having first direct current loads requiring a first direct current voltage and second direct current loads requiring a second direct current voltage and third direct current loads requiring a third direct current voltage, comprising a three phase alternator having a three phase winding connected in a wye-connection winding with a common center connection means and three phase winding terminations, a battery unit having first and second voltage terminal means having an output voltage equal to said first direct current voltage and having a third terminal means defining said second direct current voltage with said first terminal means and third direct current voltage with said second terminal means, a single rectifying circuit having first and second output terminal means and connected to the phase winding terminations of said three phase winding for establishing a direct current voltage on the order of said first direct current voltage at said first and second output terminal means, and circuit means connecting said first and second output terminal means to said first and second voltage terminal means and connecting said common connection means to said third terminal means.

14. The direct current supply system of claim 13 including load control means connected between said third terminal means and said first and second output terminal means to control total loads coupled to said second and third terminal means.

15. A direct current power supply for vehicle having a plurality of 12 volt load units and at least one 24 volt load unit, comprising a three phase alternator having a field winding and a wye-connected three phase winding with a common connection and three phase winding terminations, said alternator having means to limit the current output with speed above a selected level and having an output voltage controlled by said field winding and the speed of the alternator, said three phase winding wound to minimize the voltage generated at said common connection, a full wave diode rectifier unit having three parallel rectifying branches connected in parallel between a positive output lead and a negative output lead, each of said branches having at least two series connected diodes and having a branch center tap connected to one of said phase winding terminations, a first 12 volt battery meads, a second 12 volt battery means connected in series with said first 12 volt battery means and having first and second 24 volt output terminals at t he opposite ends to define a 24 volt battery means, a central common connection between said first and second 12 volt battery means, first and second 24 volt terminal means connected to said output terminals of the series connected first and second 12 volt battery means and adapted to supply power to a 24 volt load, 12 volt terminal means connected to the common connection of said first and second 12 volt battery means, a first 12 volt load means, first control means connecting said first load means between said first 24 volt terminal means and said 12 volt terminal means, a second 12 volt load means, second control means connecting said second load means between said 12 volt terminal means and said second 24 volt terminal means, each of said control means including a control input means for controlling the level of the said corresponding first and second load means, a voltage comparator means connected to said first and second 24 volt terminal means and said 12 volt terminal means to compare the voltage appearing across said first and second load means and operable to vary the level of said load means to establish and maintain essentially equal voltage between said third 12 volt terminal means and each of said first and second 24 volt terminal means and thereby across said first and second loads means.

16. The direct current power supply of claim 15 wherein each of said load means includes a resistive load and said control means includes a variable conductive means having a control input means connected to said comparator means to vary the conductive of said conductive 17. The power supply of claim 16 wherein one of said first and second 24 volt output terminal means is connected to a common ground for said electrical system.

18. A battery power supply system for a vehicle for supplying first load means at a selected voltage and second load means at one half said selected voltage, comprising a battery means having a series of cells connected between first and second voltage terminal means to establish said selected voltage and having a central connection between two cells of said series of cells, a center terminal means connected to said central connection in said series of cells to define two battery supplies having said half voltage between said center terminal means and each of said first and second voltage terminal means, an alternator having a polyphase winding including a plurality of phase windings connected as a wye-connected winding to polyphase output terminal means for supplying a polyphase output voltage and having center terminal means connected to said wye-connected phase winding to divide the voltage of each phase winding and having the wye-connected winding connected to establish individual battery charging circuits across said first and second voltage terminal means and across each of the center terminal means and the first and second voltage terminal means, a single full wave rectifying circuit connecting said battery means to said polyphase output terminal means and to said first and second voltage terminal means to supply full wave rectified power to said first and second voltage terminal means and to said battery means, and means connecting said intermediate terminal means of said battery means to said center terminal means of said polyphase winding for connecting the battery means to the opposite sides of said intermediate terminal means into separate charging circuits with said polyphase winding and said full wave rectifying circuit whereby the voltage of each phase winding is divided and connected in circuit through said rectifying circuit, said second load means being formed into first and second load units of similar load resistance, said first load unit connected between the center terminal means and said first full voltage terminal means, said second load unit connected between the center terminal means and said second full voltage terminal means, and means responsive to a selected difference in the voltage of said two battery supplies to connect said alternator to charge the battery supply having the lowest charge to equalize the charge of the two battery supplies.

19. The battery power supply system of claim 18 wherein said battery means is a lead-acid battery wherein the grids include antimony in an amount not substantially greater than 2 percent, or do not include antimony in any significant concentration.

20. The battery power supply system of claim 19 wherein said polyphase winding produces an alternating voltage having alternate half cycles of first polarity and alternate half cycles of a second polarity and said rectifying circuit includes a first group of controlled rectifier means connected to conduct the alternate half cycles of a first polarity of the output of said polyphase winding and a second group of controlled rectifier means connected to conduct the opposite half cycles of the second polarity of the output of said polyphase winding, the controlled rectifier means of each group being connected to each other, and a logic control means connected to said means responsive to a selected difference in the voltage of the low voltage battery supplies to separately charge each battery supply to maintain each battery supply at a selected minimum voltage.

21. The battery power supply system of claim 18 wherein said logic control means includes a switch means connected between said first and second load units and said center terminal means and operable to selectively connect said terminal means to said alternator to charge one of said two battery supplies.

* * * * *

UNITED STATES PATENT AND TRADEMARK OFFICE
CERTIFICATE OF CORRECTION

PATENT NO. : 4,816,736

DATED : March 28, 1989

INVENTOR(S) : Thomas J. Dougherty, et al

It is certified that error appears in the above-identified patent and that said Letters Patent is hereby corrected as shown below:

Col. 11, line 50, claim 1: delete "the" and substitute therefor ---said---; Col. 11, line 1, claim 2: delete "includes" and substitute therefor ---including---; Col. 11, line 59, claim 2: after "and" insert ---said---; Col. 12, line 37, claim 6: after "battery" insert ---means---; Col. 12, line 49, claim 7: after "means" insert ---is---; Col. 12, line 51, claim 7: after "is" insert ---a---; Col. 13, line 10, claim 10: delete "winding" and substitute therefor ---windings---; Col. 13, line 31, claim 10: delete "onto" and substitute therefor ---into---; Col. 13, line 39, claim 10: delete "the" and substitute therefor ---said---; Col. 13, line 47, claim 11: after "current" insert a ---.---; Col. 13, line 65, claim 13: after "and" insert ---said---; Col. 14, line 35, claim 15: delete "meads" and substitute therefor ---means---; Col. 14, line 38, claim 15: delete "t he" and substitute therefor ---the---; Col. 14, line 66, claim 15: delete "third"; Col. 14, line 68, claim 15: delete "loads" and

UNITED STATES PATENT AND TRADEMARK OFFICE
CERTIFICATE OF CORRECTION

PATENT NO. : 4,816,736
DATED : March 28, 1989
INVENTOR(S) : Thomas J. Dougherty, et al It is certified that error appears in the above-identified patent and that said Letters Patent is hereby corrected as shown below:

substitute therefor ---load---; Col. 15, line 6, claim 16: after "conductive" insert ---means.---

Signed and Sealed this

Twelfth Day of December, 1989

Attest:

JEFFREY M. SAMUELS

Attesting Officer   Acting Commissioner of Patents and Trademarks